(12) United States Patent
Ferdowsi et al.

(10) Patent No.: US 11,018,974 B1
(45) Date of Patent: May 25, 2021

(54) CONTEXT BASED BANDWIDTH SWITCHING

(71) Applicant: Zoox, Inc., Foster City, CA (US)

(72) Inventors: Mehran Ferdowsi, San Mateo, CA (US); Turhan Karadeniz, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 106 days.

(21) Appl. No.: 16/193,208

(22) Filed: Nov. 16, 2018

(51) Int. Cl.
| | |
|---|---|
| *H04L 12/721* | (2013.01) |
| *H04L 12/707* | (2013.01) |
| *H04L 12/703* | (2013.01) |
| *H04L 12/24* | (2006.01) |
| *H04L 29/14* | (2006.01) |
| *G06F 16/25* | (2019.01) |

(52) U.S. Cl.
CPC ............ *H04L 45/70* (2013.01); *G06F 16/258* (2019.01); *H04L 41/0654* (2013.01); *H04L 41/14* (2013.01); *H04L 45/22* (2013.01); *H04L 45/28* (2013.01); *H04L 69/40* (2013.01)

(58) Field of Classification Search
CPC ......... H04L 45/70; H04L 45/28; H04L 45/22; H04L 41/0654; H04L 69/40; H04L 41/14; G06F 16/258
See application file for complete search history.

(56) References Cited

U.S. PATENT DOCUMENTS

| | | | |
|---|---|---|---|
| 2018/0067487 A1* | 3/2018 | Xu | ........................ G01S 17/86 |
| 2020/0225673 A1* | 7/2020 | Ebrahimi Afrouzi | ........................ B25J 9/1697 |

FOREIGN PATENT DOCUMENTS

WO    WO-2018156991 A1 *  8/2018   ........... B64C 39/024

* cited by examiner

*Primary Examiner* — Moo Jeng
(74) *Attorney, Agent, or Firm* — Lee & Hayes, P.C.

(57) ABSTRACT

A vehicle can include various components such as sensors and computing devices, as well as a network to couple the sensors and computing devices. A capability status can indicate an error with a computing device, available computational resources of a computing device, and/or an available bandwidth among others. Sensor data can be manipulated, based on the capability status, into various formats and/or sent to various destinations.

20 Claims, 4 Drawing Sheets

CONTEXT BASED BANDWIDTH SWITCHING

BACKGROUND

An autonomous vehicle can use sensors to capture data of an environment and can use computing devices to control various systems of the vehicle. The sensors and/or the computing devices can communicate using a network. During operation, the capabilities of the computing devices and/or the network can change, which may cause suboptimal operation if unaddressed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
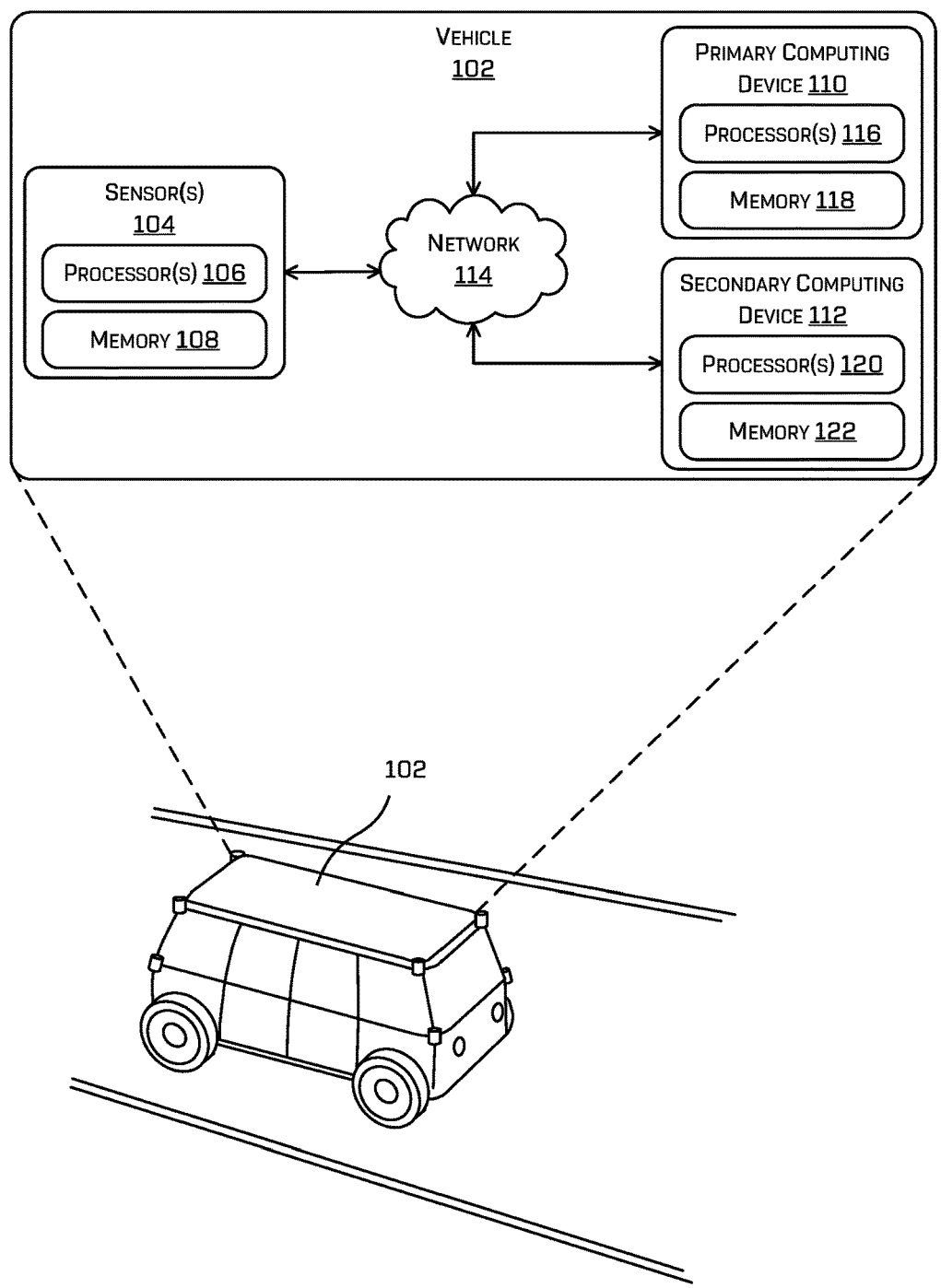
FIG. 1 depicts an example vehicle and a block diagram of an example architecture.

This disclosure describes methods, apparatuses, and systems for performing context based bandwidth switching using one or more computing systems of a vehicle. For example, an autonomous vehicle can include a plurality of sensors to capture sensor data corresponding to an environment of a vehicle. The sensor data can include data associated with an environment representing, in some instances, multiple objects (e.g., pedestrians, vehicles, bicyclists, etc.). In some instances, the vehicle can provide such sensor data to a primary computing device, whereby the primary computing device can use the data to detect and classify objects in an environment, generate a trajectory for the vehicle in the environment, and control the vehicle to follow the trajectory in the environment. In some examples, the vehicle may also include a secondary computing device that can validate operations performed by the primary computing device and can control the vehicle in the event of a failure of the primary computing device. In some examples, a sensor can comprise functionality to determine a context of the primary computing device, the secondary computing device, and/or the network of the vehicle and can determine a destination of sensor data and/or a data format associated with the destination. The sensor can generate appropriately formatted sensor data and can transmit the sensor data to a data destination based on the context of the components of the vehicle. By way of example and without limitation, a context of the vehicle may include a capability status of the primary computing device (e.g., computational load) and a capability status of the network (e.g., available bandwidth in the network, delay, etc.). Based on the capability status of the primary computing device and/or the network, the sensor can determine a data format for sensor data, a size of sensor data, and the like, and can transmit the data to an appropriate destination.

As discussed herein, sensor data can be captured by one or more sensors, which can include time-of-flight sensors, RADAR sensors, LIDAR sensors, SONAR sensors, image sensors, microphones, or any combination thereof. The sensor can include an emitter to emit a signal and a sensor to sense a return signal from the environment. Further, the sensor can comprise a sensor computing device to determine a data format of the captured sensor data.

In the context of a time of flight (ToF) sensor, the captured sensor data can be represented, for example, in a raw (e.g., a quadrature format). In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity and depth value for each pixel) in the sensor data. The sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

The sensor data in the varying data formats can represent varying amounts of computational resources and/or network resources. For example, a data format (and/or data size) can be selected or otherwise be determined based on computational resources available at primary computing device and/or a secondary computing device, and/or based on a bandwidth of the network. A data format and/or data size can be selected to optimize processing and/or transmission capabilities of the system of the vehicle in order to safely control the vehicle in the environment.

The vehicle can include a primary computing device and/or a secondary computing device, whereby a computing device associated with the sensor (also referred to as a sensor computing device) can be configured to determine the different data formats associated with the sensor data based on a data destination. For example, the primary computing device and/or the secondary computing device can receive the sensor data in the quadrature format and determine the sensor data in the intensity and depth format. In some instances, the primary computing device and/or the secondary computing device can receive the sensor data in the intensity and depth format and determine the sensor data in the unprojected format. In some instances, the sensor computing device can process captured data to generate the unprojected format and can transmit the unprojected format to the primary computing device and/or the secondary computing device. Further, the various formats can be downsampled or otherwise manipulated to vary a size of the data, which may be used to reduce a size of the data, for example, in a scenario when network bandwidth is limited.

In some examples, a sensor of the vehicle can determine a capability status associated with the primary computing device and/or the secondary computing device. For example, the sensor can determine a capability status via capability status message(s) indicative of a computational load or a delay in processing from the primary and/or secondary computing devices. In another example, the sensor can receive a "heartbeat" signal from the primary computing device, whereby the absence of the heartbeat signal can indicate a fault with the primary computing device. In another example, the sensor can receive an indication from the secondary computing device, for example, that the primary computing device is experiencing a fault. For example, the primary computing device can experience a fault where it has fewer available computational resources than at a normal operating level. In some instances, the secondary computing device can experience a fault where it has fewer available computational resources than at a normal operating level. In some instances, the primary computing device and/or the secondary computing device can detect a fault with the other or a different computing device (i.e., the secondary computing device detecting a fault with the primary computing device and/or the primary computing device detecting a fault with the secondary computing device). In some instances, the sensor can detect a fault with the primary computing device and/or the secondary computing device.

The sensor can also be configured to determine a capability status of the network. For example, the capability status can indicate the available bandwidth in the network. In some instances, the capability status can indicate the available bandwidth to a portion of the network (e.g., a portion of the network coupling the sensor to the primary computing device and/or the secondary computing device).

Using the capability status, the sensor can determine a data format for the sensor data and/or a data destination to receive the sensor data. The primary computing device and/or the secondary computing device can use the sensor data to determine a trajectory for the vehicle, among other operations.

As can be understood, determining data formats for sensor data associated with an environment and/or subsequent processing of such data can require a significant amount of cost in terms of the amount of data processing required and computing resources. Additionally, transmitting significant amounts of data increases power consumption and may also increase network congestion. Traditional methods may also consume a significant amount of time to determine data formats for sensor data associated with an environment and/or for subsequent processing of such data. Meanwhile, methods of determining a trajectory for a vehicle in an environment must provide accurate results, particularly in the context of vehicles and autonomous vehicles. Therefore, the techniques describe herein can address the technical problem of managing a change or degradation of computational resources in a computing system of a vehicle.

Additionally, the techniques discussed herein can improve a functioning of a computing device by reducing the amount of computing resources to determine the data formats for the sensor data. In some instances, reducing the amount of computing resources takes the form of reducing the amount of data operated on (e.g., by a primary computing device of a vehicle). In other instances, reducing the amount of computing resources takes the form of more efficiently processing the data. In other instances, reducing the amount of computing resources takes the form of both reducing the amount of data used, as well as more efficiently processing the data. Additionally, in some instances, reducing the amount of computing resources includes reducing processing time, reducing memory usage, reducing network congestion, and/or reducing power consumption. The techniques described herein can also maintain and/or increase the accuracy of determining data formats for sensor data and/or determining a trajectory of a vehicle. As can be understood, maintaining the operation of a computing system in a vehicle can improve safety outcomes, particularly in the context of autonomous vehicles. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In another example, the methods, apparatuses, and systems may be used in an aviation or nautical context. Additionally, the techniques described herein may be used with real data (e.g., captured using sensor(s)), simulated data (e.g., generated by a simulator), or any combination of the two.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using machine vision, and is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power sources. Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

A vehicle such as the example vehicle 102 can be used to travel through an environment and capture data. For example, the vehicle 102 can include one or more sensors 104 where, for purposes of illustration, the one or more sensors can be one or more time-of-flight sensors, LIDAR sensors, RADAR sensors, SONAR sensors, image sensors, audio sensors, infrared sensors, location sensors, etc., or any combination thereof, although other types of sensors are contemplated.

As the vehicle 102 travels through an environment, the sensors can capture sensor data associated with the environment. Additionally, some of the sensor data can be associated with objects (e.g., trees, vehicles, and pedestrians). The sensor data can be associated with other objects including, but not limited to, buildings, road surfaces, signage, barriers, etc.

The one or more sensors 104 can include one or more processors 106 and memory 108 communicatively coupled to the one or more processors 106. As discussed above, the one or more sensors 104 can determine the sensor data in various formats (e.g., a quadrature format, an intensity and depth format, and/or an unprojected format) using the one or more processors 106 and/or one or more components stored in the memory 108, as discussed throughout this disclosure.

The one or more sensors 104 can be coupled to a primary computing device 110 and a secondary computing device 112 through a network 114. The primary computing device 110 can include one or more processors 116 and memory 118 communicatively coupled to the one or more processors 116. The secondary computing device 112 can include one or more processors 120 and memory 122 communicatively coupled to the one or more processors 120. As discussed above, the primary computing device 110 and the secondary computing device 112 can use the one or more processors 116 and 120 and/or one or more components stored in the memory 118 and 122, respectively, to determine the sensor data in various formats (e.g., a quadrature format, an intensity and depth format, and/or an unprojected format).

The vehicle 102 can use the primary computing device 110 to determine a trajectory for the vehicle 102. For example, the one or more sensors 104 can determine sensor data associated with an environment and transmit the sensor data to the primary computing device 110. Then, the primary computing device 110, using the one or more processors 116, can calculate and/or generate a trajectory for the vehicle 102 using the sensor data. Further, the secondary computing device 112 can include functionality to validate an operation of the primary computing device 110 and/or may control the vehicle 102 in the event of a failure or degraded condition of the primary computing device 110. Accordingly, the sensor(s) 104 can transmit sensor data to the primary computing device 110 and/or the secondary computing device 112 based on a context of one or more components of the vehicle 102. For example, in the event of a failure of the primary computing device 110, the sensor data may select the secondary computing device as a data destination and can format sensor data in a format associated with the secondary computing device 112 so that the secondary computing device 112 can generate or modify a trajectory to control the vehicle 102 to traverse the trajectory or safely stop. In some instances, the sensor(s) 104 can transmit sensor data to the primary computing device 110 and/or the secondary computing device 112 independent of the context. For example, the sensor(s) 104 can select the primary computing device 110 as a data destination for sensor data in a first format and select the secondary computing device 112 as a data destination for sensor data in a second format prior to and/or regardless of determining an event, a fault, and/or a failure. Further, the sensor(s) 104 can send data in different formats to one or more destinations substantially simultaneously (e.g., within technical tolerances).

Figure 2:
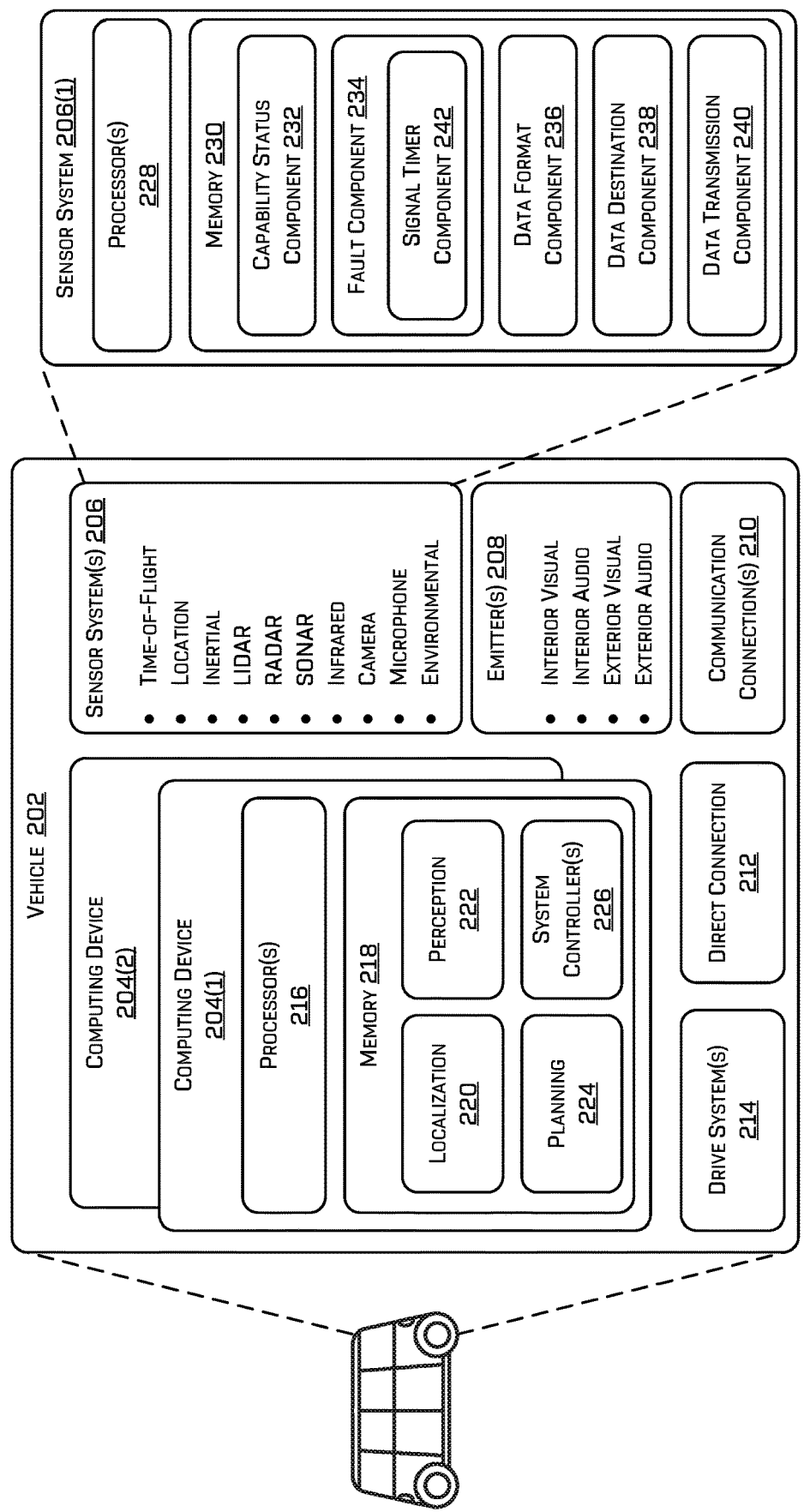
FIG. 2 depicts a block diagram of an example system for implementing the techniques described herein.

FIG. 2 depicts a block diagram of an example system 200 for implementing the techniques discussed herein. In at least one example, the system 200 can include a vehicle 202, which can be similar to the vehicle 102 described above with reference to FIG. 1. In the illustrated example 200, the vehicle 202 is an autonomous vehicle; however, the vehicle 202 can be any other type of vehicle.

The vehicle 202 can include a computing device 204(1), a computing device 204(2), one or more sensor systems 206, one or more emitters 208, one or more communication connections 210, at least one direct connection 212 (e.g., for physically coupling with the vehicle 202 to exchange data and/or to provide power), and one or more drive systems 214. In some instances, vehicle 202 can include more or fewer instances of computing device 204. The one or more sensor systems 206 can be configured to capture sensor data associated with an environment.

In at least one example, the computing device 204(1) can be similar to the primary computing device 110 described above with reference to FIG. 1. The computing device 204(1) can include one or more processors 216 and memory 218 communicatively coupled with the one or more processors 216. In at least one instance, the one or more processors 216 can be similar to the processor(s) 116 and the memory 218 can be similar to the memory 118 described above with reference to FIG. 1. In the illustrated example, the memory 218 of the computing device 204(1) stores a localization component 220, a perception component 222, a planning component 224, and one or more system controllers 226. Though depicted as residing in the memory 218 for illustrative purposes, it is contemplated that the localization component 220, the perception component 222, the planning component 224, and the one or more system controllers 226 can additionally, or alternatively, be accessible to the computing device 204(1) (e.g., stored in a different component of vehicle 202 and/or be accessible to the vehicle 202 (e.g., stored remotely).

In at least one example, the computing device 204(2) can be similar to the secondary computing device 112 described above with reference to FIG. 1. The computing device 204(2) can be configured similarly to computing device 204(1). In some instances, computing device 204(1) and 204(2) can have identical components and/or identical computational resources. In some instances, computing device 204(1) and 204(2) can have different components and/or different computational resources.

In at least one example, the localization component 220 can include functionality to receive data from the sensor system(s) 206 to determine a position of the vehicle 202. For example, the localization component 220 can include and/or request/receive a three-dimensional map of an environment and can continuously determine a location of the autonomous vehicle within the map. In some instances, the localization component 220 can use SLAM (simultaneous localization and mapping) or CLAMS (calibration, localization and mapping, simultaneously) to receive time of flight data, image data, LIDAR data, RADAR data, SONAR data, IMU data, GPS data, wheel encoder data, or any combination thereof, and the like to accurately determine a location of the autonomous vehicle. In some instances, the localization component 220 can provide data to various components of the vehicle 202 to determine an initial position of an autonomous vehicle for generating a trajectory, as discussed herein.

In some examples, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the perception component 222 (and any component of the vehicle 202) can receive sensor data (e.g., quadrature data, depth data and intensity data, and the like) from a sensor system 206(1), such as a time of flight sensor, and can process the sensor data (e.g., perform an unprojection operation) to generate a three-dimensional representation of the environment and/or any objects present in the environment and their relative locations.

In some instances, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding data horizon having the highest confidence level may be selected to operate the vehicle.

In other examples, the planning component 224 can alternatively, or additionally, use data from the perception component 222 to determine a path for the vehicle 202 to follow to traverse through an environment. For example, the planning component 224 can receive data from the perception component 222 regarding objects associated with an environment. Using this data, the planning component 224 can determine a route to travel from a first location (e.g., a current location) to a second location (e.g., a target location) to avoid objects in an environment. In at least some examples, such a planning component 224 may determine there is no such collision free path and, in turn, provide a trajectory which brings vehicle 202 to a safe stop avoiding all collisions and/or otherwise mitigating damage.

In at least one example, the computing device 204(1) can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202, which may be configured to operate in accordance with a trajectory provided from the planning component 224.

In at least one example, the sensor system(s) 206 can be similar to sensor(s) 104 described above with reference to FIG. 1. The sensor system(s) 104 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 can include multiple instances of each of these or other types of sensors. For instance, the time-of-flight sensors can include individual time-of-flight sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the computing device 204.

A single instance of a sensor system is illustrated as a sensor system 206(1). The sensor system 206(1) can include one or more processors 228 and memory 230 communicatively coupled with the one or more processors 228. The one or more processors 228 can be similar to the processor(s) 106 and the memory 230 can be similar to the memory 108 described above with reference to FIG. 1. In the illustrated example, the memory 230 of the sensor system 206(1) can store a capability status component 232, a fault component 234, a data format component 236, a data destination component 238, and a data transmission component 240. Though depicted as residing in the memory 230 for illustrative purposes, it is contemplated that the capability status component 232, the fault component 234, the data format component 236, the data destination component 238, and/or the data transmission component 240 can additionally, or alternatively, be accessible to the sensor system 206(1) (e.g., stored in a different component of vehicle 202 and/or be accessible to the vehicle 202 (e.g., stored remotely).

The capability status component 232 can be configured to receive or otherwise determine a capability status associated with the computing device 204(1) and/or the computing device 204(2). For example, the computing device 204(1) and/or 204(2) can transmit, through a network (e.g., network 114), a capability status to the capability status component 232. In some instances, the capability status component 232 can retrieve the capability status from the computing device 204(1) and/or 204(2). In some instances, the capability status component 232 can transmit a capability status request to the computing device 204(1) and/or 204(2) and the computing device 204(1) and/or 204(2) can transmit a capability status to the capability status component 232 in response to the capability status request. In some instances, the computing device 204(1) and/or 204(2) can respond on behalf of the other or a different computing device. For example, the capability status component 232 can transmit a capability status request to the computing device 204(1) and the computing device 204(2) can respond with the capability status of the computing device 204(1) by monitoring requests associated with the computing device 204(1).

In some instances, the computing device 204(1) and/or 204(2) can transmit a capability status of the other or a different computing device without receiving a capability status request. For example, the computing device 204(2) can monitor the computing device 204(1) determine that the functioning of computing device 204(1) is below a resource availability threshold. Then, computing device 204(2) can transmit a capability status to the capability status component 232 indicating that the functioning of computing device 204(1) is below the resource availability threshold. In some instances, the computing device 204(1) and/or the computing device 204(2) can send a capability status of their respective capability statuses or a capability status of the other or a different computing device based on a predetermined schedule. For purposes of illustration only, the computing device 204(1) can send a capability status to the capability status component 232 every 10 milliseconds (ms), 50 ms, 100 ms, 10 seconds, the like. In some instances, and for purposes of illustration only, the computing device 204(2) can send a capability status associated with the computing device 204(1) to the capability status component 232 every 10 ms, 50 ms, 100 ms, 10 seconds, the like. Of course, any time period (or aperiodic transmission, e.g., once, twice, occasionally, as needed, etc.) of signal can be used in accordance with the disclosure.

In some instances, the capability status component 232 can determine a capability status of a network (e.g., network 114). For example, the capability status component 232 can monitor an amount of network traffic and/or an amount of available bandwidth on the network to determine a capability status of the network. In some instances, the capability status component 232 can determine a capability status of a portion of the network associated with the computing device 204(1) and/or 204(2). For purposes of illustration only, the capability status component 232 can determine that the portion of the network associated with the computing device 204(1) is functioning below a resource availability threshold (e.g., an amount of bandwidth associated with nominal operation) where the available bandwidth is 10 gigabits per second (Gbps) and the resource availability threshold is 50 Gbps. Then, the capability status component 232 can determine that the portion of the network associated with the computing device 204(2) is functioning at or above the resource availability threshold of 50 Gbps where the available bandwidth is 100 Gbps. In some cases, a resource availability threshold can be based at least in part on a data format and/or a data type of sensor data. Of course, the example thresholds are illustrative and are not intended to be limiting.

The capability status component 232 can receive a capability status of a network from a different component monitoring the network. For example, the network can include a switch component that directs traffic in the network and monitors the capability status of the network and/or portions of the network.

The fault component 234 can determine that a fault has and/or may occur based on the capability status. For example, the capability status component 232 can receive a capability status from the computing device 204(1) and/or 204(2) and, based on the capability status, the fault component 234 can determine that a fault has occurred in the computing device 204(1) and/or 204(2). In some instances, the capability status can indicate the fault. For purposes of illustration only, the capability status can indicate that the computing device that transmitted the capability status is powering down. In some instances, the capability status can indicate an available computational resource associated with the computing device 204(1) and/or 204(2) and the fault component 234 can determine that the available computational resource is below a resource availability threshold. For purposes of illustration only, the computing device 204(1) can transmit a capability status indicating available computational resources such as a processor clock frequency, a number of instructions per second, and/or a number of floating point operations per second, load level, latency and/or delay information, although other suitable measures of available computational resources are contemplated. The capability status can be transmitted to the capability status component 232 and the fault component 234 can determine that the available computational resources indicated by the capability status does not meet or exceed the resource availability threshold and determine that a fault has occurred with the computing device 204(1). As discussed above, in some instances, the computing device 204(1) and/or 204(2) can send a capability status associated with the other or a different computing device.

The fault component 234 can include a signal timer component 242. The signal timer component 242 can determine if a time period associated with the computing device 204(1) and/or 204(2) has expired. For example, and as discussed above, the computing device 204(1) and/or 204(2) can transmit a capability status to the capability status component 232 on a periodic basis (e.g., a "heartbeat" signal). In some instances, the capability status component 232 can request the capability status on a periodic basis. The signal timer component 242 can determine if a time period for receiving the capability status has expired. For purposes of illustration only, the computing device 204(1) can be configured to transmit a capability status to the capability status component 232 at intervals of 10 milliseconds (ms), 50 ms, 100 ms, 10 seconds, or the like. Of course, any time interval may be used. The signal timer component 242 can determine if the time period has expired and provide an indication that the time period has expired to the fault component 234. Then the fault component 234 can determine that a fault associated with the computing device 204(1) has occurred.

The data format component 236 can determine different data formats such associated with sensor data. In the context of a time of flight sensor, the data format component 236 can determine a data format such as a quadrature format, an intensity and depth format, and/or an unprojected format. For example, sensor system 206(1) (e.g., a time of flight sensor) can emit a carrier (also referred to as a signal) and receive a response carrier (also referred to as a response signal). Based on the carrier and the response carrier, the data format component 236 can determine the sensor data in a quadrature format. In some instances, the data format component 236 can measure a phase shift between the carrier and the response carrier and/or perform numerical integration calculations to determine the sensor data in the quadrature format (e.g., determining one or more of a quadrature from the response signal).

The data format component 236 can also determine an intensity and depth format of the sensor data, which may also be referred to as depth image. For example, using the sensor data, the data format component 236 can determine depth and intensity values for each point associated with an object in an environment.

The data format component 236 can also determine the sensor data in an unprojected format. For example, an unprojection can refer to a transformation from a two-dimensional frame of reference into a three-dimensional frame of reference, while a projection can refer to a transformation from a three-dimensional frame of reference into a two-dimensional frame of reference. In some instances, the data format component 236 can determine a relative location of sensor system(s) 206 (e.g., relative to one or more other sensors or systems) and can unproject the data into the three-dimensional representation based at least in part on the intensity and depth format, intrinsic and extrinsic information associated with the sensor system(s) 206 (e.g., focal length, center, lens parameters, height, direction, tilt, distortion, etc.), and the known location of the sensor system(s) 206. In some instances, the point can be unprojected into the three-dimensional frame, and the distances between the sensor system(s) 206 and the points in the three-dimensional frame can be determined (e.g., <x, y, z>).

In some instances, the points unprojected into a three-dimensional frame can correspond to a detailed map representing an environment that has been generated or built up over time using measurements from the sensor system(s) 206 or other mapping software and/or hardware. Accordingly, based at least in part on a known location of the vehicle 202 and a known location of the sensor system(s) 206, the data format component 236 can use a three-dimensional surface to unproject captured data into the three-dimensional frame. Such unprojected data may then be used to determine a location in the environment, detections, classifications, and segmentations of objects in the environment, and the like.

As used herein, the term "unproject," "unprojected," or "unprojecting" can refer to a conversion of two-dimensional data into three-dimensional data, while in some cases, the term "project," "projected," or "projecting" can refer to a conversion of three-dimensional data into two-dimensional data. In some instances, determining the various formats of sensor data (e.g., the quadrature format, the intensity and depth format, and the unprojected format) can require different amounts of computational resources to determine and/or require different amounts of bandwidth to transmit.

In some instances, the data format component 236 can determine, based on sensor data, subset sensor data that consumes less data storage space and/or less bandwidth during transmission. For example, the sensor system(s) 206 can capture sensor data at a particular resolution. The data format component 236 can downsample the sensor data to a resolution lower than the particular resolution. For purposes of illustration only, the sensor data can be captured at a VGA resolution (i.e., 640×480 pixels) and the data format component 236 can downsample the sensor data to a QVGA resolution (i.e., 320×240 pixels). This can result in a lower amount of sensor data and improve the functioning of a computing device by decreasing an amount of computational resources required to determine (e.g., parse or process) the various data formats for the sensor data.

In some instances, the data format component 236 can use other techniques to downsample the sensor data and/or reduce the amount of data consumed by the sensor data including Gaussian blur, linear algorithms, bicubic interpolation, binning techniques, and/or compression algorithms, although other suitable techniques and/or algorithms are contemplated. In some instances, the techniques and/or algorithms can be determined based on a vehicle action. For purposes of illustration only, the computing device 204(1) and/or 204(2) can determine to take a vehicle action such as an emergency stop. The data format component 236 can determine to reduce the resolution associated with the sensor data to reduce an amount of data and/or an amount of bandwidth used by the sensor data based on the emergency stop action not requiring sensor data with a higher resolution.

In some instances, the data format component 236 can capture sensor data and discard and/or disregard a portion of the sensor data to determine subset sensor data. For purposes of illustration only, the sensor system(s) 206 can capture sensor data at a VGA resolution and determine a region of interest as a middle portion (or any arbitrary portion) of the sensor data. The data format component 236 can then use the sensor data to determine the subset sensor data with a resolution of 440×480 by removing a left column portion of pixels (e.g., 100×480) and a right column portion of pixels (100×480). In some instances, a region of interest can be based at least in part on a detected object or edges represented in the sensor data.

In some instances, the data format component 236 can determine the sensor data in the intensity and depth format and reduce a level of precision. For purposes of illustration only, the sensor system(s) 206(1) can determine the sensor data in the intensity and depth format where an individual pixel in the sensor data is associated with an 8-bit value for the intensity and a 12-bit value for the depth. The data format component 236 can, for example, reduce the amount of data used by using, for example, a 4-bit value for the intensity and a 6-bit value for the depth. In some examples, a data format of captured data can comprise the depth data without the intensity data, or vice versa. In some instances, the data format component 236 can determine the sensor data in a data format that preserves edges while or independent of reducing a level of precision of the sensor data. To preserve edges in the sensor data, the data format component 236 can, for example, determine that portions of the sensor data that indicate depth discontinuities. The depth discontinuities can indicate an edge of an object (e.g., road surface, sidewalk, a vehicle, a person, etc.). The data format component 236 can determine the portions of the sensor data that indicate an edge of an object as edge data and, in some instances, preserve a level of precision of the edge data.

The data destination component 238 can determine a destination of the sensor data in the various formats. For example, the data destination component can, based at least in part on the capability status, the data format, and/or a determination by the fault component 234, determine a destination for the sensor data in any data format. In some instances, the capability status component 232 can receive a capability status that instructs the sensor system(s) 206 to use the computing device 204(1) and/or 204(2) as the data destination. For purposes of illustration only, the computing device 204(1) can transmit a capability status to the capability status component 232 that indicates that the computing device 204(2) should be the data destination, and vice versa.

In some instances, the data destination component 238 can, based at least in part on the capability status received at the capability status component 232, determine one of the computing device 204(1) or 204(2) as the data destination. For purposes of illustration only, the computing device 204(1) can transmit a capability status to the capability status component 232 that indicates that the computing device 204(1) is experiencing a fault condition. In response to the indication of a fault condition associated with the computing device 204(1), the data destination component 238 can determine that the computing device 204(1) should remain the data destination and/or that sensor data should be sent to the computing device 204(2) as a data destination.

By way of example, and without limitation, the components of the sensor system 206(1) can determine a data destination and/or a data format for captured sensor data. For example, in a case where the computing device 204(1) receives the captured sensor data, the capability status component 232 can determine that the computing device 204(1) has limited computing resources. However, the computing device 204(1) may remain functional, in which case the data destination component 238 may determine that the computing device 204(1) is to remain as the data destination. However, based at least in part on the capability status, the data format component can determine a data format (and/or data size) for the computing device 204(1) based on the limited computing resources of the computing device 204 (1).

By way of another example, the capability status component 232 can determine that a network of the vehicle 202 (e.g., the network 114) is experiencing congestion, in which case the computing device 204(1) can remain the data destination. However, the data format component 236 can vary a data format and/or data size such that sensor data is transmitted to the computing device 204(1) in accordance with any bandwidth limitations of the network 114.

By way of another example, the capability status component 232 can determine that the computing device 204(1) is not functioning, and accordingly, the data destination component 238 can select the computing device 204(2) as the data destination. The data format component 236 can select a format in accordance with the computing device 204(2) as the data destination. Other examples are contemplated herein.

In some instances, the capability status component 232 can determine a capability status associated with a network or a portion of the network. As discussed herein, the data destination component 238 can determine, based at least in part on the capability status associated with the network or a portion of the network, a data destination and/or can instruct the data format component 236 to maintain the sensor data format or change the sensor data to a different format.

In some instances, the data destination component 238 can determine all computing devices or a portion of all computing devices as the data destination to broadcast or partially broadcast the sensor data in varying data formats.

The data transmission component 240 can transmit the sensor data in the data format determined by the data format component 236 to the data destination determined by the data destination component 238.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the computing device 204(1) to another computing device (e.g., the computing device 204(2)) or an external network (e.g., the Internet). For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more modules to perform various functionalities of the drive system(s) 214. Furthermore, the drive system(s) 214 also include one or more communication connection(s) that enable communication by the respective drive system with one or more other local or remote computing device(s).

The processor(s) 216 of the vehicle 202 and the processor(s) 106, 116, and 120 of the sensors 104, primary computing device 110, and secondary computing device 112 of FIG. 1 can be any suitable processor capable of executing instructions to process data and perform operations as described herein. By way of example and not limitation, the processor(s) 216, 228, 106, 116, and 120 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 218 and the memory 108, 118, and 122 of the sensors 104, primary computing device 110, and secondary computing device 112 of FIG. 1 are examples of non-transitory computer-readable media. The memory 218, 108, 118, and 122 can store an operating system and one or more software applications, instructions, programs, and/or data to implement the methods described herein and the functions attributed to the various systems. In various implementations, the memory 218, 108, 118, and 122 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 218, 108, 118, and 122 can be implemented as a neural network.

It should be noted that components of the computing device 204(1) can be associated with the sensor(s) 104, the primary computing device 110, and/or the secondary computing device 112.

Figure 3:
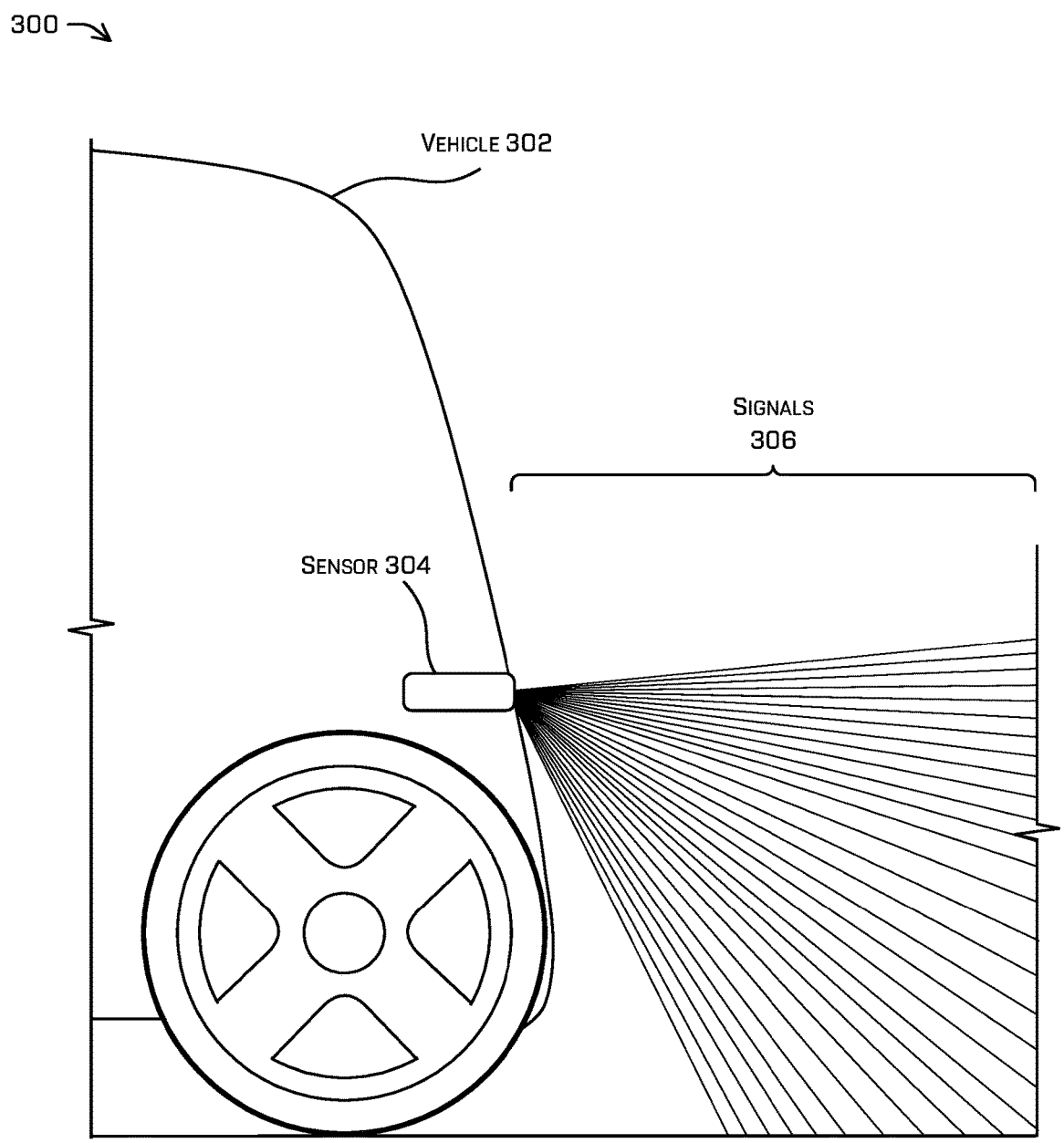
FIG. 3 depicts an example sensor on a vehicle capturing sensor data of an environment.

FIG. 3 depicts an example 300 of a vehicle 302 and a sensor 304 capturing sensor data of an environment. In at least one example, the vehicle 302 can be similar to the vehicle 102 described above with reference to FIG. 1 and/or the vehicle 202 described above with reference to FIG. 2. Additionally, in at least one example, the sensor 304 can be similar to the system sensor 206(1) described above with reference to FIG. 2. As discussed above, sensor 304 can be a time-of-flight sensor. Example 300 further illustrates the sensor 304 capturing sensor data, as discussed herein, by emitting signals 306. In some examples, the sensor 304 can be used to capture data of the environment directly adjacent to the vehicle 302, for example, at a range of 0-10 meters, although other ranges are contemplated herein.

Figure 4:
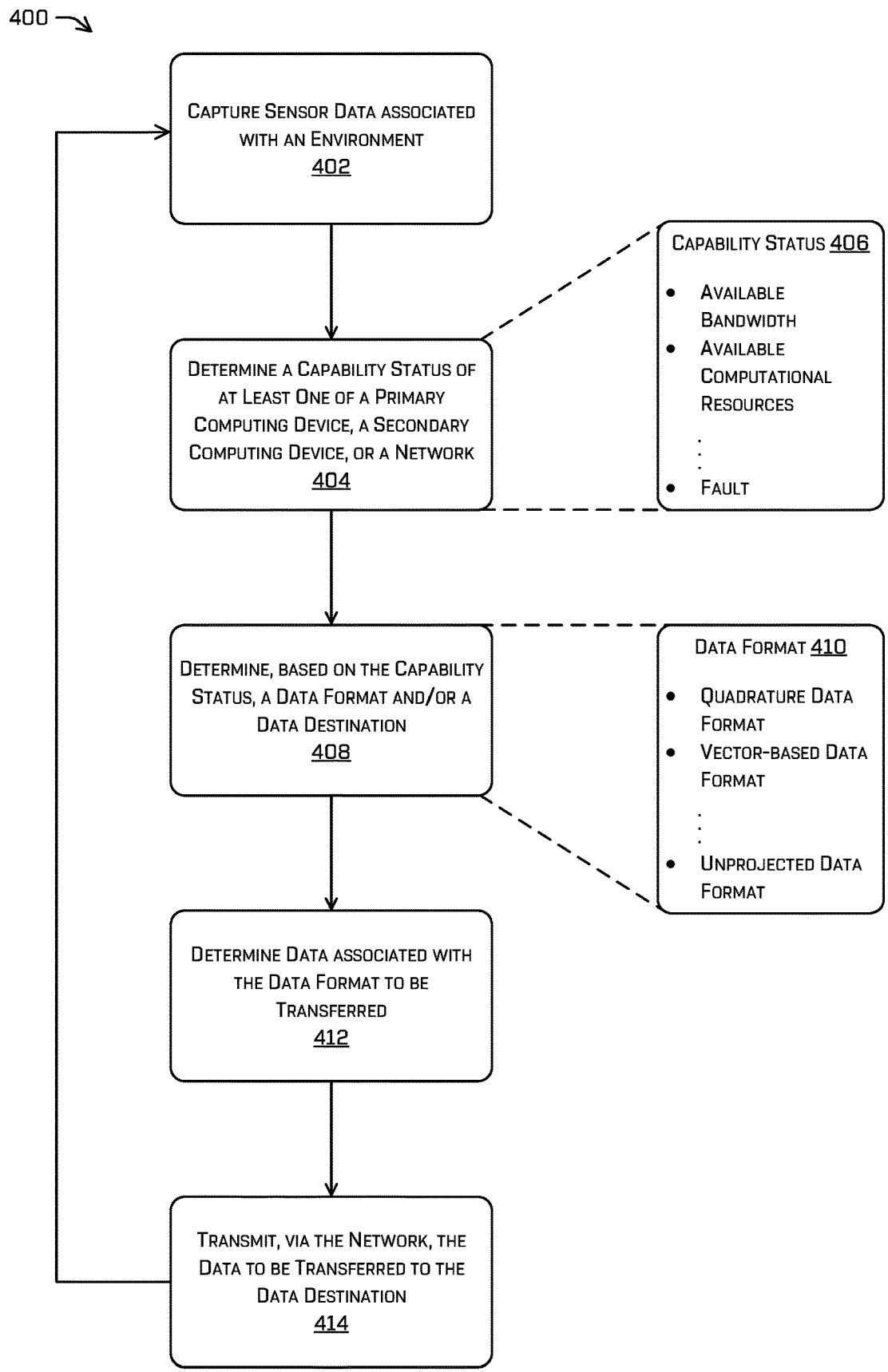
FIG. 4 is a flow diagram representative of one or more processes for context based bandwidth switching, as described herein.

FIG. 4 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 depicts an example process 400 for determining a data format associated with sensor data, determining a data destination for the data format, and transmitting the sensor data in the data format to the data destination. In some instances, some or all of process 400 can be performed by one or more components in FIG. 1 or 2, as described herein. The process 400 is described with reference to the vehicle 202 in FIG. 2 and/or the vehicle 102 in FIG. 1. Additionally, some portions of process 400 can be omitted, replaced, and/or reordered while still providing the functionality of determining the data format, determining the data destination, and transmitting the sensor data in the data format to the data destination.

At operation 402, sensor system(s) 206 can capture sensor data associated with an environment. As discussed above, the sensor system(s) 206 can include time-of-flight sensors, RADAR sensors, LIDAR sensors, SONAR sensors, image sensors, microphones, or any combination thereof. In some instances, the sensor system(s) 206 can include a sensor emitter to emit a carrier and a carrier sensor to capture a return carrier and determine sensor data. The sensor data can represent time-of-flight data, RADAR data, LIDAR data, SONAR, data, image data, audio data, or any combination thereof.

At operation 404, the capability status component 232 can determine a capability status 406 of at least one of a primary computing device (e.g., the computing device 204(1)), a secondary computing device (e.g., the computing device 204(2)), and/or a network (e.g., the network 114). A capability status 406 is an example of the capability status determined in the operation 404, and can indicate an available bandwidth and/or available computational resources. For example, the network 114 and or portions of the network 114 can be associated with a capability status 406 indicating an amount of available bandwidth. In some instances, the computing device 204(1) and/or the computing device 204 (2) can indicate available computational resources and/or a fault condition determined by the fault component 234. In some instances, a computing device can provide a capability status 406 of a different computing device. In some instances, the capability status 406 can be provided periodically and, in some instances, the signal timer component 242 can determine if a time period associated with the periodic capability status 406 has expired (e.g., that a heartbeat signal is not received).

At operation 408, the process can include determining, based on the capability status, a data format and/or a data destination. For example, in the operation 408, the data format component 236 can determine a type of data format 410 associated with the sensor data and/or the data destination component 238 can determine a destination for the sensor data. As discussed above, in the context of a time-of-flight sensor, the data format 410 can represent one or more of quadrature data, depth data and intensity data, unprojected data, and the like.

At operation 412, the data format component 236 can, based on the type of data format 410, determine the sensor data in the data format 410. As discussed above, in some instances, the sensor data in the data format 410 can be a size of data based on, for example, available bandwidth in a network. In some instances, the sensor data in the data format 410 can be a format based on, for example, available computational resources of a computing device (and/or whether a computing device is operational).

At operation 414, the data transmission component 240 can transmit the sensor data in the data format 410 to the data destination determined by the data destination component 238

For purposes of illustration only, the data transmission component 240 can send sensor data in a depth and intensity-based format (e.g., as depth data and intensity data) to computing device 204(1) where computing device 204(1) can, using the sensor data in the depth and intensity-based format, determine (e.g., derive) the sensor data in the unprojected format. Then, the capability status component 232 can determine an amount of available computational resources associated with computing device 204(1) via a capability status 406. Based on the capability status 406, the fault component 234 can determine that the amount of available computational resources does not meet or exceed a computational resource threshold in order to determine the sensor data in the unprojected format from the sensor data in the depth and intensity-based format. Based on determining that the computational resource threshold is not met, the data format component 236 can determine the sensor data in the unprojected data format and the data transmission component 240 can transmit the sensor data in the unprojected data format to the computing device 204(1).

By way of another example, and without limitation, the data transmission component 240 can send sensor data in a depth and intensity-based format to computing device 204(1) where computing device 204(1) can, using the sensor data in the depth and intensity-based format, determine (e.g., derive) the sensor data in the unprojected format. Then, the capability status component 232 can determine a capability status 406 indicating that the computing device 204(1) is not responsive. Based on the capability status 406, the fault component 234 can determine that computing device 204(1) is in a fault state. The data format component 236 can determine (e.g., derive) the sensor data in the unprojected data format and the data transmission component 240 can transmit the sensor data in the unprojected data format to the computing device 204(2). In some instances, the vehicle 202 can continue normal operation while computing device 204(2) receives the sensor data in the unprojected format. In some instances, the computing device 204(2) can use the sensor data in the unprojected format and system controllers 226 to bring vehicle 202 to a controlled stop while avoiding objects in an environment. In some instances, the computing device 204(2) can continue to operate vehicle 202 in a reduced capacity such as reduced speed and/or operating fewer components of vehicle 202.

By way of another example, and without limitation, the data transmission component 240 can send sensor data in a depth and intensity-based format to computing device 204(1) where computing device 204(1) can, using the sensor data in the depth and intensity-based format, derive or otherwise determine the sensor data in the unprojected format. Then, the capability status component 232 can determine a capability status 406 indicating that the amount of available bandwidth associated with the network 114. Based on the amount of available bandwidth, the fault component 234 can determine that the amount of available bandwidth does not meet or exceed a bandwidth threshold associated with the depth and intensity-based format. Then, the data format component 236 can determine the sensor data using a fewer number of bits to represent the sensor data to reduce the amount of data storage and/or amount of bandwidth required to transmit the sensor data. The data format component 236 can then determine the sensor data in the depth and intensity-based format using the fewer number of bits and the data transmission component 240 can transmit the sensor data in the depth and intensity-based format using the fewer number of bits to the computing device 204(1).

By way of another example, and without limitation, the computing device 204(1) can perform floating point calculations using the sensor data in the quadrature-based format. The computing device 204(1) can transmit a capability status 406 to the capability status component 232 indicating for the sensor system 206(1) to transmit the sensor data in the quadrature-based format to the computing device 204(1). In response to the capability status, the data format component 236 can determine the sensor data in the quadrature-based format and the data destination component 238 can determine the computing device 204(1) as the data destination. Then the data transmission component 240 can transmit the sensor data in the quadrature-based format to the computing device 204(1).

As can be understood, determining (e.g., deriving) the sensor data in different data formats can consume varying amounts of computational resources (e.g., processing resources and/or data storage resources) and provide varying amounts precision. By way of example, and without limitation, the sensor data represented as depth data and intensity data can, in some instances, consume the least amount of data storage resources (of the quadrature data, depth data and intensity data, and unprojected data) while the unprojected data can consume the most amount of data storage resources (of the quadrature data, depth data and intensity data, and unprojected data). Further, by way of example and without limitation, processing the sensor data represented as quadrature data can, in some instances, consume the most amount of processing resources (of the quadrature data, depth data and intensity data, and unprojected data) while processing the sensor data represented as unprojected data can consume the least amount of processing resources (of the quadrature data, depth data and intensity data, and unprojected data). Additionally, the sensor data represented as quadrature data can, in some instances, provide more precision than the depth data and intensity data. In some instances, the sensor system 206(1) can determine data formats and data destinations using the factors such as the processing resources, the data storage resources, and/or the amount of precision in the sensor data using a default configuration and/or based on contextual factors (e.g., available computational resources, fault conditions, environmental conditions, etc.).

Accordingly, the techniques discussed herein provide a flexible framework for determining a context of components of a vehicle and determining a data destination, a data format, and/or a data size of data so that a vehicle can continue operating in a safe manner.

EXAMPLE CLAUSES

A: A system comprising: one or more processors; and one or more computer readable media storing computer executable instructions that, when executed, cause the one or more processors to perform operations comprising: capturing first sensor data associated with a first format using a time of flight sensor on a vehicle; determining, based on the first sensor data, second sensor data associated with a second format, wherein the second format comprises one of: (i) quadrature data, (ii) intensity data and depth data, or (iii) unprojected data; transmitting, via a network, the second sensor data to a primary computing device; determining a capability status associated with one or more of the primary computing device, a secondary computing device, or the network, wherein the primary computing device is associated with generating a trajectory to control the vehicle; determining, based on the capability status, a data destination comprising one or more of the primary computing device or a secondary computing device; determining, based on the data destination and the second sensor data, third sensor data associated with a third format, wherein the third format is different from the second format; transmitting, via the network, the third sensor data to the data destination; and controlling, based at least in part on the third sensor data, the vehicle.

B: The system as recited in paragraph A, wherein the capability status is an error condition associated the primary computing device, and wherein the operations further comprise: determining, based at least in part on the error condition being associated with the primary computing device, the secondary computing device as the data destination.

C: The system as recited in paragraph A or B, wherein determining the capability status comprises one or more of: receiving, from one or more of the primary computing device or the secondary computing device, an indication of an error condition; receiving, from one or more of the primary computing device or the secondary computing device, a command to redirect a data transmission; determining that a time period associated with a signal received from the primary computing device has expired; or determining that an available bandwidth associated with the network is below a threshold value.

D: The system as recited in paragraph C, wherein determining the capability status comprises receiving the indication of the error condition from the primary computing device, and wherein the indication comprises computational load data associated with the primary computing device.

E. The system as recited in paragraph C or D, wherein determining the capability status comprises receiving the indication of the error condition from the secondary computing device, and wherein the operations further comprise: determining, based at least in part on receiving the indication from the secondary computing device, the secondary computing device as the data destination.

F: The system as recited in any of paragraphs A-E, wherein a difference between the second format and the third format comprises one or more of: a difference in data size by reducing a number of bits used to represent the third sensor data; a difference in data type, wherein the difference in data type represents a change from a depth and intensity based sensor data type to a coordinate based sensor data type; or a change from a first resolution associated with the second format to a second resolution associated with the third format, the second resolution lower than the first resolution.

G: A method comprising: determining a capability status associated with one or more of a first computing device, a second computing device, or a network; determining, based at least in part on the capability status, a data destination comprising one or more of the first computing device or the second computing device; determining, based at least in part on the capability status, a data format comprising one of: (i) quadrature data, (ii) intensity data and depth data, or (iii) unprojected data; capturing sensor data of an environment, the sensor data associated with the data format using a time of flight sensor on a vehicle; and transmitting, via the network, the sensor data to the data destination.

H: The method as recited in paragraph G, wherein the data format comprises the quadrature data, wherein the data destination is the first computing device, and wherein the sensor data is to be processed by the first computing device to determine a multi dimensional representation of the environment.

I: The method as recited in paragraph G or H, wherein the data format comprises the intensity data and depth data, wherein the data destination is the first computing device, and wherein the sensor data is to be processed by the first computing device to determine a multi dimensional representation of the environment.

J. The method as recited in any of paragraphs G-I, further comprising: determining, based at least in part on the capability status, that the second computing device is the data destination; and determining, based at least in part on determining that the second computing device is the data destination, the data format as the unprojected data.

K: The method as recited in any of paragraphs G-J, further comprising: determining, based at least in part on the capability status, an available bandwidth associated with the network; and determining, based at least in part on the available bandwidth, the data format as the quadrature data.

L: The method as recited in any of paragraphs G-K, wherein the vehicle is an autonomous vehicle, and wherein the method further comprises: determining, using the first computing device and based at least in part on the sensor data, a first trajectory for the autonomous vehicle at a first time; determining, based at least in part on the capability status, the data destination as the second computing device; determining, using the second computing device and based at least in part on the sensor data, a second trajectory for the autonomous vehicle at a second time; and controlling, based at least in part on the second trajectory, the autonomous vehicle.

M: The method as recited in any of paragraphs G-L, wherein determining the capability status comprises determining that a time period associated with a signal received from the first computing device has expired, and wherein the method further comprises: determining, based at least in part determining that the time period has expired, the second computing device as the data destination.

N: A nontransitory computer readable medium storing instructions executable by a processor, wherein the instructions, when executed, cause the processor to perform operations comprising: determining, using a time of flight sensor on a vehicle, first sensor data associated with a first format; transmitting, via a network, the first sensor data to a first computing device; determining a capability status associated with one or more of the first computing device, a second computing device, or the network; determining, based at least in part on the capability status, a data destination comprising one or more of the first computing device or the second computing device; determining, based at least in part on the capability status, a second format different from the first format; and determining, based at least in part on the first sensor data and the second format, second sensor data associated with the second format; and transmitting, via the network, the second sensor data to the data destination.

O: The non-transitory computer readable medium as recited in paragraph N, wherein the operations further comprise: determining a region of interest associated with the first sensor data; and wherein determining the second sensor data is further based at least in part on the region of interest.

P: The non-transitory computer readable medium as recited in paragraph N or O, wherein the operations further comprise: determining, based at least in part on the first sensor data, subset sensor data; and wherein determining the second sensor data is further based at least in part on the subset sensor data.

Q: The non-transitory computer readable medium as recited in any of paragraphs N-P, wherein determining a capability status comprises: determining that a time period associated with a signal has expired, the signal associated with the first computing device.

R: The non-transitory computer readable medium as recited in any of paragraphs N-Q, wherein determining the data destination comprises determining the first computing device and the second computing device as the data destination, and wherein transmitting the second sensor data to the data destination comprises: transmitting, via the network, the second sensor data to the first computing device; and transmitting, via the network, the second sensor data to the second computing device.

S: The non-transitory computer readable medium as recited in any of paragraphs N-R, wherein the capability status is associated with the second computing device, and wherein determining the data destination comprises determining the second computing device as the data destination.

T: The non-transitory computer readable medium as recited in any of paragraphs N-S, wherein the first sensor data is associated with a first resolution and the second sensor data is associated with a second resolution that is lower than the first resolution.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing computer-executable instructions that, when executed, cause the one or more processors to perform operations comprising:
capturing first sensor data associated with a first format using a time-of-flight sensor on a vehicle;
determining, based on the first sensor data, second sensor data associated with a second format, wherein the second format comprises one of: (i) quadrature data, (ii) intensity data and depth data, or (iii) unprojected data;
transmitting, via a network, the second sensor data to a primary computing device;
determining a capability status associated with one or more of the primary computing device, a secondary computing device, or the network, wherein the primary computing device is associated with generating a trajectory to control the vehicle;
determining, based on the capability status, a data destination comprising one or more of the primary computing device or the secondary computing device;
determining, based on the data destination and the second sensor data, third sensor data associated with a third format, wherein the third format is different from the second format;
transmitting, via the network, the third sensor data to the data destination; and
controlling, based at least in part on the third sensor data, the vehicle.

2. The system as recited in claim 1, wherein the capability status is an error condition associated the primary computing device, and wherein the operations further comprise:
determining, based at least in part on the error condition being associated with the primary computing device, the secondary computing device as the data destination.

3. The system as recited in claim 1, wherein determining the capability status comprises one or more of:
receiving, from one or more of the primary computing device or the secondary computing device, an indication of an error condition;
receiving, from one or more of the primary computing device or the secondary computing device, a command to redirect a data transmission;
determining that a time period associated with a signal received from the primary computing device has expired; or
determining that an available bandwidth associated with the network is below a threshold value.

4. The system as recited in claim 3, wherein determining the capability status comprises receiving the indication of the error condition from the primary computing device, and wherein the indication comprises computational load data associated with the primary computing device.

5. The system as recited in claim 3, wherein determining the capability status comprises receiving the indication of the error condition from the secondary computing device, and wherein the operations further comprise:
determining, based at least in part on receiving the indication from the secondary computing device, the secondary computing device as the data destination.

6. The system as recited in claim 1, wherein a difference between the second format and the third format comprises one or more of:
a difference in data size by reducing a number of bits used to represent the third sensor data;

a difference in data type, wherein the difference in data type represents a change from a depth and intensity-based sensor data type to a coordinate-based sensor data type; or a change from a first resolution associated with the second format to a second resolution associated with the third format, the second resolution lower than the first resolution.

7. A method comprising:
determining a capability status associated with one or more of a first computing device, a second computing device, or a network;
determining, based at least in part on the capability status, a data destination comprising one or more of the first computing device or the second computing device;
determining, based at least in part on the capability status, a data format comprising one of: (i) quadrature data, (ii) intensity data and depth data, or (iii) unprojected data;
capturing sensor data of an environment, the sensor data associated with the data format using a time-of-flight sensor on a vehicle; and
transmitting, via the network, the sensor data to the data destination.

8. The method as recited in claim 7, wherein the data format comprises the quadrature data, wherein the data destination is the first computing device, and wherein the sensor data is to be processed by the first computing device to determine a multi-dimensional representation of the environment.

9. The method as recited in claim 7, wherein the data format comprises the intensity data and depth data, wherein the data destination is the first computing device, and wherein the sensor data is to be processed by the first computing device to determine a multi-dimensional representation of the environment.

10. The method as recited in claim 7, further comprising:
determining, based at least in part on the capability status, that the second computing device is the data destination; and
determining, based at least in part on determining that the second computing device is the data destination, the data format as the unprojected data.

11. The method as recited in claim 7, further comprising:
determining, based at least in part on the capability status, an available bandwidth associated with the network; and
determining, based at least in part on the available bandwidth, the data format as the quadrature data.

12. The method as recited in claim 7, wherein the vehicle is an autonomous vehicle, and wherein the method further comprises:
determining, using the first computing device and based at least in part on the sensor data, a first trajectory for the autonomous vehicle at a first time;
determining, based at least in part on the capability status, the data destination as the second computing device;
determining, using the second computing device and based at least in part on the sensor data, a second trajectory for the autonomous vehicle at a second time; and
controlling, based at least in part on the second trajectory, the autonomous vehicle.

13. The method as recited in claim 7, wherein determining the capability status comprises determining that a time period associated with a signal received from the first computing device has expired, and wherein the method further comprises:
determining, based at least in part determining that the time period has expired, the second computing device as the data destination.

14. A non-transitory computer-readable medium storing instructions executable by a processor, wherein the instructions, when executed, cause the processor to perform operations comprising:
determining, using a time-of-flight sensor on a vehicle, first sensor data associated with a first format;
transmitting, via a network, the first sensor data to a first computing device;
determining a capability status associated with one or more of the first computing device, a second computing device, or the network;
determining, based at least in part on the capability status, a data destination comprising one or more of the first computing device or the second computing device;
determining, based at least in part on the capability status, a second format different from the first format; and
determining, based at least in part on the first sensor data and the second format, second sensor data associated with the second format; and
transmitting, via the network, the second sensor data to the data destination.

15. The non-transitory computer-readable medium as recited in claim 14, wherein the operations further comprise:
determining a region of interest associated with the first sensor data; and
wherein determining the second sensor data is further based at least in part on the region of interest.

16. The non-transitory computer-readable medium as recited in claim 14, wherein the operations further comprise:
determining, based at least in part on the first sensor data, subset sensor data; and
wherein determining the second sensor data is further based at least in part on the subset sensor data.

17. The non-transitory computer-readable medium as recited in claim 14, wherein determining a capability status comprises:
determining that a time period associated with a signal has expired, the signal associated with the first computing device.

18. The non-transitory computer-readable medium as recited in claim 14, wherein determining the data destination comprises determining the first computing device and the second computing device as the data destination, and wherein transmitting the second sensor data to the data destination comprises:
transmitting, via the network, the second sensor data to the first computing device; and
transmitting, via the network, the second sensor data to the second computing device.

19. The non-transitory computer-readable medium as recited in claim 14, wherein the capability status is associated with the second computing device, and wherein determining the data destination comprises determining the second computing device as the data destination.

20. The non-transitory computer-readable medium as recited in claim 14, wherein the first sensor data is associated with a first resolution and the second sensor data is associated with a second resolution that is lower than the first resolution.

* * * * *